(12) United States Patent
Jin et al.

(10) Patent No.: US 11,653,184 B2
(45) Date of Patent: May 16, 2023

(54) CALL PROMPT METHOD

(71) Applicant: HUAWEI TECHNOLOGIES CO., LTD., Guangdong (CN)

(72) Inventors: Hui Jin, Beijing (CN); Xiaoguang Wu, Shenzhen (CN); Kaiyu Jiang, Shenzhen (CN); Liwen Tan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 17/237,161

(22) Filed: Apr. 22, 2021

(65) Prior Publication Data

US 2021/0243573 A1    Aug. 5, 2021

Related U.S. Application Data

(63) Continuation of application No. 16/067,244, filed as application No. PCT/CN2015/100178 on Dec. 31, 2015, now Pat. No. 10,999,716.

(51) Int. Cl.
*H04W 4/16* (2009.01)

(52) U.S. Cl.
CPC ................................. *H04W 4/16* (2013.01)

(58) Field of Classification Search
CPC ..... H04M 1/576; H04M 1/72427; H04W 4/16
USPC ........................................ 455/566; 379/93.19
See application file for complete search history.

(56) References Cited

U.S. PATENT DOCUMENTS

| | | |
|---|---|---|
| 5,418,846 A | 5/1995 | Yuasa |
| 5,588,037 A | 12/1996 | Fuller et al. |
| 5,615,257 A | 3/1997 | Pezzullo et al. |
| 5,712,909 A | 1/1998 | Hara |
| 5,933,089 A | 8/1999 | Katada |
| 5,959,544 A | 9/1999 | Matsuura |
| 5,987,109 A | 11/1999 | Hara |
| 6,175,617 B1 | 1/2001 | Hara |
| 6,246,888 B1 | 6/2001 | Tsuchiyama |

(Continued)

FOREIGN PATENT DOCUMENTS

| | | |
|---|---|---|
| CN | 1416257 A | 5/2003 |
| CN | 1809191 A | 7/2006 |

(Continued)

OTHER PUBLICATIONS

Wikipedia "2G" Aug. 5, 2022 (Year: 2022).*

(Continued)

*Primary Examiner* — William D Cumming
(74) *Attorney, Agent, or Firm* — Fish & Richardson P.C.

(57) ABSTRACT

A call prompt methods and terminals. One example method includes displaying a first interface on a display screen of a first terminal, showing that the first terminal is in a call with a second terminal via a CDMA communication network, while the first terminal is in the call with the second terminal, displaying a second interface on the display screen that prompts that a third terminal is initiating a call to the first terminal. Outputting a sound that includes a prompt tone and a call voice between the first terminal and the second terminal, the prompt tone that the third terminal is initiating a call to the first terminal, and when the call initiated by the third terminal is rejected by the first terminal's user, continuing output the call voice between the first terminal and the second terminal, and stopping output the prompt tone.

15 Claims, 7 Drawing Sheets

(56) References Cited

U.S. PATENT DOCUMENTS

| | | |
|---|---|---|
| 6,459,781 B1 | 10/2002 | Hara |
| 6,614,781 B1 | 9/2003 | Elliott et al. |
| 6,954,524 B2 | 10/2005 | Gibson |
| 7,076,045 B2 | 7/2006 | Gibson |
| 7,555,110 B2 | 6/2009 | Dolan et al. |
| 7,564,840 B2 | 7/2009 | Elliott et al. |
| 7,782,494 B2 * | 8/2010 | Chida ............... H04N 1/32683 |
| | | 358/439 |
| 7,822,188 B1 | 10/2010 | Kirchhoff et al. |
| 7,912,016 B2 | 3/2011 | Kubler et al. |
| 7,974,609 B2 * | 7/2011 | Lee ...................... H04M 1/576 |
| | | 379/93.19 |
| 8,036,214 B2 | 10/2011 | Elliott et al. |
| 8,085,761 B2 | 12/2011 | Elliott et al. |
| 8,089,958 B2 | 1/2012 | Elliott et al. |
| 8,270,421 B2 | 9/2012 | Elliott et al. |
| 8,325,901 B1 | 12/2012 | Dolan et al. |
| 8,351,591 B2 | 1/2013 | Kirchhoff et al. |
| 8,488,206 B2 | 7/2013 | Chida |
| 8,503,665 B1 | 8/2013 | Meisel |
| 8,693,347 B2 | 4/2014 | Elliott et al. |
| 8,891,753 B2 | 11/2014 | Kirchhoff et al. |
| 9,319,523 B2 | 4/2016 | Kirchhoff et al. |
| 9,647,978 B2 | 5/2017 | Kirchhoff et al. |
| 10,999,716 B2 * | 5/2021 | Jin ........................ H04W 4/16 |
| 2003/0039397 A1 | 2/2003 | Tsuchida |
| 2003/0169459 A1 | 9/2003 | Chida |
| 2003/0228011 A1 | 12/2003 | Gibson |
| 2004/0022237 A1 | 2/2004 | Elliott et al. |
| 2005/0195957 A1 | 9/2005 | Gibson |
| 2005/0254475 A1 | 11/2005 | Kubler et al. |
| 2006/0203986 A1 | 9/2006 | Gibson |
| 2007/0072593 A1 | 3/2007 | Huliyapur Math |
| 2007/0087789 A1 * | 4/2007 | Lee ................... H04M 1/72427 |
| | | 455/566 |
| 2007/0265006 A1 | 11/2007 | Washok et al. |
| 2008/0013531 A1 | 1/2008 | Elliott et al. |
| 2008/0025294 A1 | 1/2008 | Elliott et al. |
| 2008/0025295 A1 | 1/2008 | Elliott et al. |
| 2008/0101554 A1 | 5/2008 | Rhee et al. |
| 2010/0284042 A1 | 11/2010 | Chida |
| 2011/0026701 A1 | 2/2011 | Kirchhoff et al. |
| 2011/0164535 A1 | 7/2011 | Gillipalli et al. |
| 2012/0177195 A1 | 7/2012 | Elliott et al. |
| 2013/0070757 A1 | 3/2013 | Elliott et al. |
| 2013/0195264 A1 | 8/2013 | Kirchhoff et al. |
| 2013/0343205 A1 | 12/2013 | Dolan et al. |
| 2015/0215459 A1 | 7/2015 | Kirchhoff et al. |
| 2015/0358459 A1 | 12/2015 | Spievak et al. |
| 2016/0301653 A1 | 10/2016 | Kirchhoff et al. |
| 2019/0246443 A1 | 8/2019 | Li et al. |
| 2020/0280824 A1 * | 9/2020 | Jin ........................ H04M 1/724 |
| 2021/0243573 A1 * | 8/2021 | Jin ........................ H04W 4/16 |

FOREIGN PATENT DOCUMENTS

| | | | |
|---|---|---|---|
| CN | 1878337 A | * | 12/2006 |
| CN | 1878337 A | | 12/2006 |
| CN | 1956577 A | | 5/2007 |
| CN | 101155398 | | 4/2008 |
| CN | 101552970 | | 10/2009 |
| CN | 102664863 A | | 9/2012 |
| CN | 103002421 | | 3/2013 |
| CN | 102088748 | | 4/2013 |
| CN | 104363335 A | | 2/2015 |
| CN | 104602211 | | 5/2015 |
| JP | 2003337164 | | 11/2003 |
| JP | 2003337164 A | * | 11/2003 |
| WO | 1997031472 | | 8/1997 |
| WO | WO-2017113322 A1 | * | 7/2017 ............ H04M 1/724 |

OTHER PUBLICATIONS

Wikipedia "Cellular Network Standards and Generation Timeline" 2022 (Year: 2022).*

Solomon Ndungu "CDMA (Code-Division Multiple Access)" Mar. 2021 (Year: 2021).*

English Translation of JP-2003337164-A (Year: 2022).*

English Translation of CN-1878337-A (Year: 2022).*

K. L. Cohen and R. F. Ricca, "Transaction network, telephones, and terminals: Dial access interface," in The Bell System Technical Journal, vol. 57, No. 10, pp. 3441-3453, Dec. 1978, doi: 10.1002/j.1538-7305.1978.tb02952.x. (Year: 1978).*

Office Action issued in Chinese Application No. 202010642929.X dated Aug. 12, 2021, 18 pages (with English translation).

International Search Report and Written Opinion issued in International Application No. PCT/CN2015/100178 dated Sep. 18, 2016, 9 pages.

Office Action issued in Chinese Application No. 201580085682.3 dated Nov. 14, 2019, 7 pages.

Zhong et al., "Research on detection algorithm of multi-class telephone signal tones," International Conference on Audio, Language and Image Processing, Jul. 2008, pp. 697-700.

* cited by examiner

CALL PROMPT METHOD

CROSS-REFERENCE TO RELATED APPLICATIONS

This application is a continuation of U.S. patent application Ser. No. 16/067,244, filed on Jun. 29, 2018, which is a national stage of International Application No. PCT/CN2015/100178, filed on Dec. 31, 2015. Both of the aforementioned applications are hereby incorporated by reference in their entireties.

TECHNICAL FIELD

The present invention relates to the communications field, and in particular, to a call prompt method.

BACKGROUND

As communications technologies develop, voice communication becomes a basic daily communication manner of people. A mobile terminal interacts with a network based on a communications protocol, so as to implement voice communication between different users.

A current voice call has some problems that trouble users. For example, a user A uses a mobile phone A, a user B uses a mobile phone B, and a user C uses a mobile phone C. When the mobile phone A and the mobile phone B that communicate based on a CDMA (Code Division Multiple Access, Code Division Multiple Access) communications standard are in a call state, if the mobile phone C calls the mobile phone A, the user A hears constant prompt tones "beep" while hearing a voice of the user B, and a prompt of the call from the mobile phone C is displayed on a user interface of the mobile phone A. The user A may cut off the call from the mobile phone C. However, after the user A cuts off the call from the mobile phone C, the prompt tone "beep" from the mobile phone A does not disappear.

In addition, after the mobile phone A detects the call from the mobile phone C, if the mobile phone C abandons the call, the prompt tone on the mobile phone A disappears, but the call interface indicating that the mobile phone C initiates a call is still displayed. If the user A selects to answer the call, because the mobile phone C has abandoned the call, the call between the mobile phone A and the mobile phone C cannot be actually established, the call between the mobile phone A, and the mobile phone B is suspended.

Voice calls are almost indispensable to people's daily life. If the foregoing case occurs for multiple times or even frequently, a trouble is certainly brought to the users. Therefore, for the foregoing symptom, how to eliminate interference caused by the unconnected new call to the current call when the mobile phone A is in a call state is an urgent problem that needs to be resolved.

SUMMARY

Embodiments of the present invention provide a call prompt method, so as to resolve an existing problem, that is, to eliminate interference caused when a call initiated by a mobile phone C is unconnected in a process of a call between a mobile phone A and a mobile phone B.

According to a first aspect, an embodiment of the present invention provides a call prompt method in a CDMA communications network, including:

displaying a first interface on a display screen of a first terminal, where the first interface shows that a first terminal is in a call with a second terminal;

displaying a second interface on the display screen of the first terminal, where the second interface prompts that a third terminal initiates a call to the first terminal, and at this moment, the first terminal is still in a call with the second terminal;

outputting, on the first terminal, a sound, where the sound includes a prompt tone and a call voice between the first terminal and the second terminal, and the prompt tone is used to prompt that the third terminal initiates a call to the first terminal; and if the call initiated by the third terminal to the first terminal is rejected, continuing outputting, on the first terminal, the call voice between the first terminal and the second terminal, and stopping outputting the prompt tone;

if the third terminal stops initiating the call to the first terminal, displaying the first interface on the display screen of the first terminal, and continuing outputting, on the first terminal, the call voice between the first terminal and the second terminal.

According to the method provided in the first aspect of the present invention, in a process of the call between the first terminal and the second terminal, the third terminal initiates a call to the first terminal. If the first terminal rejects the call initiated by the third terminal, the first terminal no longer outputs a prompt tone "beep" while normally outputting the call voice between the first terminal and the second terminal. In this way, after rejecting the call initiated by the third terminal, a user eliminates impact of the rejected call on the current call in a timely manner. Alternatively, after the third terminal stops the call to the first terminal, the first terminal may return an interface of the call between the first terminal and the second terminal in a timely manner, so as to prevent the user from answering the call that cannot be actually connected and that is initiated by the third terminal. This avoids interference caused by the call interface to the current call.

With reference to the first aspect, in a first implementation of the first aspect, the first terminal determines, by detecting that the prompt tone disappears, that the third terminal stops initiating the call to the first terminal.

In a current communications standard, after the third terminal stops initiating the call to the first terminal, a network does not send a notification message to the first terminal, and the first terminal cannot directly learn whether the third terminal stops the call. However, it is learned, by means of analysis, that after the third terminal stops the call, a downlink signal received by the first terminal does not include a prompt tone. Therefore, the first terminal may determine, by detecting whether the downlink signal includes a prompt tone, whether the third terminal stops the call.

With reference to the first implementation of the first aspect, in a second implementation of the first aspect, the detecting, by the first terminal, that the prompt tone disappears specifically includes:

if the first terminal detects no prompt tone in N prompt tone detection periods, determining that the prompt tone disappears, where N is greater than or equal to 2.

The prompt tone is a signal that appears at equal time intervals. If no prompt tone is detected in a preset quantity of periods, the first terminal determines that the call prompt tone disappears, and further determines that the third terminal stops the call.

With reference to the first aspect, in a third implementation of the first aspect, the first terminal stops outputting the prompt tone by changing an amplitude value of a frequency corresponding to the prompt tone.

All voice signals have specific time-frequency characteristics. The prompt tone is also a type of voice signal. If a spectrum characteristic of the prompt tone can be learned, the prompt tone may be eliminated by changing, at the frequency corresponding to the prompt tone, the amplitude value of the frequency, so that the first terminal stops outputting the prompt tone.

With reference to the first or the second implementation of the first aspect, in a fourth implementation of the first aspect, that the first terminal detects the prompt tone includes:

parsing, by the first terminal, a system broadcast message of a current cell to obtain network information, obtaining, according to the network information, prompt tone information pre-stored in the first terminal, and then detecting a prompt tone in a received downlink signal according to the pre-stored prompt tone information.

If the pre-stored prompt tone information is corresponding to prompt tone information in the downlink signal, the first terminal may detect the prompt tone by using the system broadcast message. This is easy to implement.

With reference to the fourth implementation of the first aspect, in a fifth implementation of the first aspect, the network information includes a home operator network and a network standard.

With reference to the first or the second implementation of the first aspect, in a sixth implementation of the first aspect, the first terminal detects the prompt tone by using a linear spectrum detection method.

With reference to the sixth implementation of the first aspect, in a seventh implementation of the first aspect, a fundamental frequency of the prompt tone is a single-frequency tone that has a constant amplitude and a constant frequency; and the detecting, by the mobile terminal, the prompt tone by using a linear spectrum detection method includes:

performing, by the first terminal, channel decoding and voice decoding on the received downlink signal, so as to obtain pulse code modulation PCM data;

dividing the PCM data into multiple overlapping data frames;

multiplying each of the multiple data frames by a window function, and performing a Fourier transformation, so as to obtain a complex spectrum;

calculating, at each pre-estimated frequency, a correlation coefficient between complex spectra of a previous frame and a current frame in a relaxation period; and determining, by the first terminal, that the prompt tone is detected on a corresponding frequency if the correlation coefficient exceeds a preset threshold.

By using a linear spectrum detection method to detect the prompt tone, prompt tones in different communications standards can be detected. This method is quite generic, and has high detection accuracy.

With reference to the seventh implementation of the first aspect, in an eighth implementation of the first aspect, after the first terminal receives the call initiated by the third terminal, the method further includes: obtaining, according to network information obtained by the first terminal by parsing a system broadcast message of a current cell, prompt tone information pre-stored in the first terminal, and then detecting a prompt tone in the downlink signal according to the pre-stored prompt tone information; and after the determining, by the first terminal, that the prompt tone is detected on a corresponding frequency if the correlation coefficient exceeds a preset threshold, the method further includes:

comparing a frequency and an amplitude of the detected prompt tone with a frequency and an amplitude in the prompt tone information pre-stored in the first terminal, and if a comparison result is that the frequency and the amplitude of the detected prompt tone are the same as the frequency and the amplitude in the prompt tone information pre-stored in the first terminal, or differences between the frequency and the amplitude of the detected prompt tone and the frequency and the amplitude in the prompt tone information pre-stored in the first terminal do not exceed comparison thresholds, determining, by the mobile terminal, that the prompt tone is detected.

With the solution in which a comparison is further performed, accuracy of prompt tone detection may be improved.

According to a second aspect, an embodiment of the present invention provides a terminal used in a Code Division Multiple Access CDMA communications network, including:

a display module, configured to display a first interface, where the first interface shows that the terminal is in a call with a second terminal, where the display module is further configured to display a second interface, where the second interface prompts that a third terminal initiates a call to the terminal, and at this moment, the terminal is still in a call with the second terminal;

a processing module, configured to detect whether the call initiated by the third terminal to the terminal is rejected, where the processing module is further configured to detect whether the third terminal stops initiating the call to the terminal; and an output module, configured to output a sound, where the sound includes a prompt tone and a call voice between the terminal and the second terminal, and the prompt tone is used to prompt that the third terminal initiates a call to the terminal, where the output module is further configured to: when the processing module detects that the call initiated by the third terminal to the terminal is rejected, continue outputting the call voice between the terminal and the second terminal, and stop outputting the prompt tone; or when the processing module detects that the third terminal stops initiating the call to the terminal, continue outputting the call voice between the first terminal and the second terminal; and the display module is further configured to: when the processing module detects that the third terminal stops initiating the call to the terminal, and the output module continues outputting the call voice between the first terminal and the second terminal, display the first interface.

According to the terminal provided in the second aspect of the present invention, in a process of the call between the terminal and the second terminal, the third terminal initiates a call to the terminal. If the terminal rejects the call initiated by the third terminal, the terminal no longer outputs a prompt tone "beep" while normally outputting the call voice between the terminal and the second terminal. In this way, after rejecting the call initiated by the third terminal, a user eliminates impact of the rejected call on the current call in a timely manner. Alternatively, after the third terminal stops the call to the terminal, the terminal may return an interface of the call between the terminal and the second terminal in a timely manner, so as to prevent the user from answering the call that cannot be actually connected and that is initiated by the third terminal. This avoids interference caused by the call interface to the current call.

The terminal provided in the second aspect of the present invention may be further configured to implement the first to the eighth implementations of the call prompt method in the first aspect, and details are not described herein again.

According to a third aspect, an embodiment of the present invention provides a processor used in a CDMA communications network, where the processor is configured to perform the following operations:

controlling to display a first interface, where the first interface shows that the terminal is in a call with a second terminal;

controlling to display a second interface, where the second interface prompts that a third terminal initiates a call to the terminal, and at this moment, the terminal is still in a call with the second terminal;

outputting a sound, where the sound includes a prompt tone and a call voice between the terminal and the second terminal, and the prompt tone is used to prompt that the third terminal initiates a call to the terminal;

if the call initiated by the third terminal to the terminal is rejected, continuing outputting the call voice between the terminal and the second terminal, and stopping outputting the prompt tone; and/or if the third terminal stops initiating the call to the terminal, controlling to display the first interface, and continuing outputting, on the terminal, the call voice between the terminal and the second terminal.

The processor provided in the third aspect of the present invention can implement the call prompt method in the first aspect. By using the processor, after rejecting the call initiated by the third terminal, a user may eliminate impact of the rejected call on the current call in a timely manner. Alternatively, after the third terminal stops the call to the terminal, the terminal may return an interface of the call between the terminal and the second terminal in a timely manner, so as to prevent the user from answering the call that cannot be actually connected and that is initiated by the third terminal. This avoids interference caused by the call interface to the current call.

The processor provided in the third aspect of the present invention may be further configured to implement the first to the eighth implementations of the call prompt method in the first aspect, and details are not described herein again.

According to a fourth aspect, an embodiment of the present invention provides a terminal used in a CDMA communications network, where the terminal includes:

a transceiver, configured to communicate with a network device;

a display screen, configured to display information and receive user input;

a memory; and a processor, configured to invoke one or more programs stored in the memory, so as to perform the following operations:

displaying a first interface on the display screen, where the first interface shows that the terminal is in a call with a second terminal;

displaying a second interface on the display screen, where the second interface prompts that a third terminal initiates a call to the terminal, and at this moment, the terminal is still in a call with the second terminal;

outputting, on the terminal, a sound, where the sound includes a prompt tone and a call voice between the terminal and the second terminal, and the prompt tone is used to prompt that the third terminal initiates a call to the terminal; and if the call initiated by the third terminal to the terminal is rejected, continuing outputting, on the terminal, the call voice between the terminal and the second terminal, and stopping outputting the prompt tone; and/or if the third terminal stops initiating the call to the terminal, displaying the first interface on the display screen of the terminal, and continuing outputting, on the terminal, the call voice between the terminal and the second terminal.

According to the terminal provided in the fourth aspect of the present invention, in a process of the call between the terminal and the second terminal, the third terminal initiates a call to the terminal. If the terminal rejects the call initiated by the third terminal, the terminal no longer outputs a prompt tone "beep" while normally outputting the call voice between the terminal and the second terminal. In this way, after rejecting the call initiated by the third terminal, a user eliminates impact of the rejected call on the current call in a timely manner. Alternatively, after the third terminal stops the call to the terminal, the terminal may return an interface of the call between the terminal and the second terminal in a timely manner, so as to prevent the user from answering the call that cannot be actually connected and that is initiated by the third terminal. This avoids interference caused by the call interface to the current call.

The terminal provided in the fourth aspect of the present invention may be further configured to implement the first to the eighth implementations of the call prompt method in the first aspect, and details are not described herein again.

According to a fifth aspect, an embodiment of the present invention provides a call prompt method, including:

displaying a first interface on a display screen of a first terminal, where the first interface shows that a first terminal is in a call with a second terminal;

displaying a second interface on the display screen of the first terminal, where the second interface prompts that a third terminal initiates a call to the first terminal, and at this moment, the first terminal is still in a call with the second terminal;

outputting, on the first terminal, a sound, where the sound includes a prompt tone and a call voice between the first terminal and the second terminal, the prompt tone is used to prompt a call event, and the call event indicates that the third terminal initiates a call to the first terminal;

if the call initiated by the third terminal to the first terminal is rejected, eliminating, by the first terminal, the prompt tone in a downlink signal, so as to continue outputting, on the first terminal, the call voice between the first terminal and the second terminal, and stop outputting the prompt tone to stop prompting the call event; and/or if the first terminal detects, by detecting the prompt tone, that the third terminal stops initiating the call to the first terminal, stopping displaying the second interface on the display screen of the first terminal, displaying the first interface, and continuing outputting, on the first terminal, the call voice between the first terminal and the second terminal.

For other implementations of the call prompt method provided in the fifth aspect of the embodiments of the present invention, refer to the first to the eighth implementations of the call prompt method provided in the first aspect, and details are not described herein again.

According to a sixth aspect, an embodiment of the present invention provides a terminal, including:

a display module, configured to display a first interface, where the first interface shows that the terminal is in a call with a second terminal, where the display module is further configured to display a second interface, where the second interface prompts that a third terminal initiates a call to the terminal, and at this moment, the terminal is still in a call with the second terminal;

a processing module, configured to detect whether the call initiated by the third terminal to the terminal is rejected, where the processing module is further configured to detect whether the third terminal stops initiating the call to the terminal; and an output module, configured to output a sound, where the sound includes a prompt tone and a call voice between the terminal and the second terminal; and the prompt tone is used to prompt that the third terminal initiates a call to the terminal, where the processing module is further configured to: when detecting that the call initiated by the third terminal to the terminal is rejected, eliminating the prompt tone in a downlink signal, so that the output module continues outputting the call voice between the terminal and the second terminal, and stops outputting the prompt tone; or when the processing module detects, by detecting the prompt tone, that the third terminal stops initiating the call to the terminal, continue outputting the call voice between the first terminal and the second terminal: and the display module is further configured to: when the processing module detects that the third terminal stops initiating the call to the terminal, and the output module continues outputting the call voice between the first terminal and the second terminal, display the first interface.

The terminal provided in the sixth aspect of the embodiments of the present invention may further correspondingly implement other implementations of the call prompt method in the fifth aspect, and details are not described herein again.

According to a seventh aspect, an embodiment of the present invention provides a processor, where the processor is configured to perform the following operations:

controlling to display a first interface, where the first interface shows that the terminal is in a call with a second terminal;

controlling to display a second interface, where the second interface prompts that a third terminal initiates a call to the terminal, and at this moment, the terminal is still in a call with the second terminal;

outputting a sound, where the sound includes a prompt tone and a call voice between the terminal and the second terminal, and the prompt tone is used to prompt that the third terminal initiates a call to the terminal;

if the call initiated by the third terminal to the terminal is rejected, eliminating, by the processor, the prompt tone in a downlink signal, so as to continue outputting the call voice between the terminal and the second terminal, and stop outputting the prompt tone; and/or if the processor detects, by detecting the prompt tone, that the third terminal stops initiating the call to the terminal, controlling to display the first interface, and continuing outputting, on the terminal, the call voice between the terminal and the second terminal.

The processor provided in the seventh aspect of the present invention may be further configured to implement all other implementations of the call prompt method in the fifth aspect, and details are not described herein again.

According to an eighth aspect, an embodiment of the present invention provides a terminal, where the terminal includes:

a transceiver, configured to communicate with a network device;

a display screen, configured to display information and receive user input;

a memory; and a processor, configured to invoke one or more programs stored in the memory, so as to perform the following operations:

displaying a first interface on the display screen, where the first interface shows that the terminal is in a call with a second terminal;

displaying a second interface on the display screen, where the second interface prompts that a third terminal initiates a call to the terminal, and at this moment, the terminal is still in a call with the second terminal;

outputting, on the terminal, a sound, where the sound includes a prompt tone and a call voice between the terminal and the second terminal, and the prompt tone is used to prompt that the third terminal initiates a call to the terminal; and if the call initiated by the third terminal to the terminal is rejected, eliminating, by the terminal, the prompt tone in a downlink signal, so as to continue outputting, on the terminal, the call voice between the terminal and the second terminal, and stop outputting the prompt tone; and/or if the terminal detects, by detecting the prompt tone, that the third terminal stops initiating the call to the terminal, displaying the first interface on the display screen of the terminal, and continuing outputting, on the terminal, the call voice between the terminal and the second terminal.

According to the method, the processor, and the terminal provided in the fifth to the eighth aspects of the present invention, in a process of the call between the first terminal and the second terminal, if the first terminal rejects the call initiated by the third terminal, the first terminal may eliminate the prompt tone in the downlink signal, and no longer outputs a prompt tone "beep" while normally outputting the call voice between the first terminal and the second terminal. In this way, after rejecting the call initiated by the third terminal, a user eliminates impact of the rejected call on the current call in a timely manner. Alternatively, the first terminal may perform prompt tone detection in real time; and after learning, by detecting the prompt tone, that the third terminal stops the call to the first terminal, the first terminal may return an interface of the call between the first terminal and the second terminal in a timely manner, so as to prevent the user from answering the call that cannot be actually connected and that is initiated by the third terminal. This avoids interference caused by the call interface to the current call.

BRIEF DESCRIPTION OF DRAWINGS

To describe the technical solutions in the embodiments of the present invention more clearly, the following briefly describes the accompanying drawings required for describing the embodiments or the prior art. The accompanying drawings in the following description show merely some embodiments of the present invention, and a person of ordinary skill in the art may still derive other drawings from these accompanying drawings.

DESCRIPTION OF EMBODIMENTS

Figure 1:
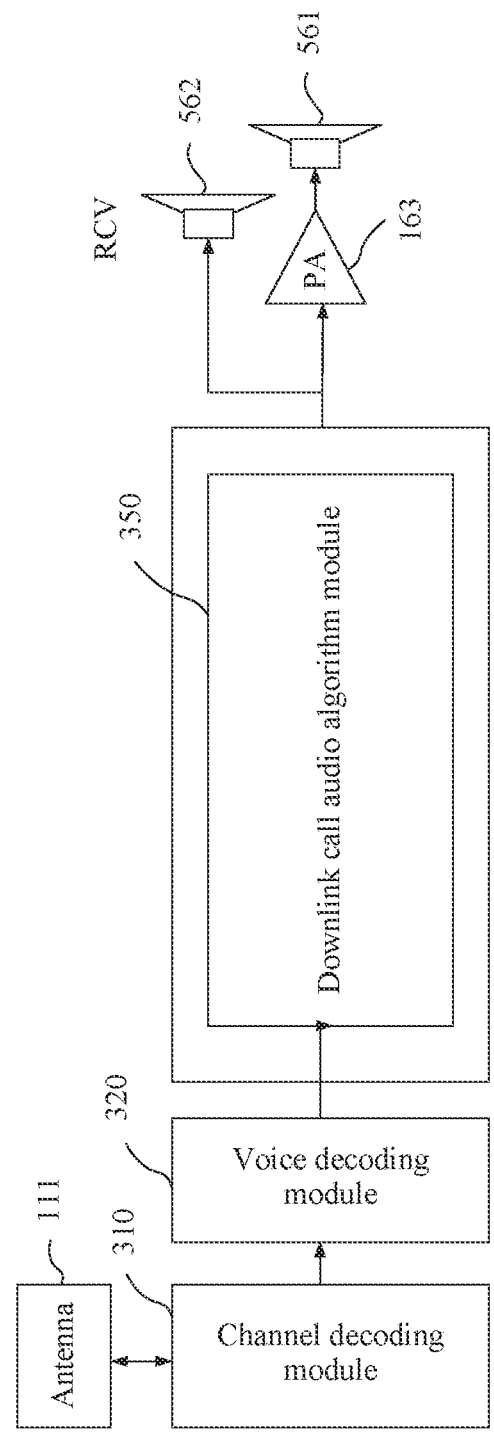
FIG. 1 is a schematic diagram of processing a downlink signal by a terminal disclosed in an embodiment of the present invention.

To make the objectives, technical solutions, and advantages of the present invention clearer, the following further describes the embodiments of the present invention in detail with reference to the accompanying drawings. To understand the present invention, the following detailed description mentions many specific details. However, a person skilled in the art should understand that the present invention may be implemented without these specific details. In other embodiments, well-known methods, processes, components, and circuits are not described in detail, so as to prevent the embodiments from being blurred. Apparently, the described embodiments are some rather than all of the embodiments of the present invention. All other embodiments obtained by a person of ordinary skill in the art based on the embodiments of the present invention without creative efforts shall fall within the protection scope of the present invention.

The terms used in the embodiments of the present invention are merely intended to better describe specific embodiments, and are not intended to limit the present invention. The terms "a", "said", and "the" of singular forms used in the embodiments and the appended claims of the present invention are also intended to include plural forms, unless otherwise specified in the context clearly. In the specification, claims, and accompanying drawings of the present invention, the terms "first", "second", "third", and so on are intended to distinguish between different objects but do not indicate a particular order. It should also be understood that, the term "and/or" used herein indicates and includes any or all possible combinations of one or more associated listed items. It should be further understood that the term "include" adopted in the specification specifies presence of features, integers, steps, operations, elements and/or components, with presence or attachment of other features, integers, steps, operations, components, elements, and their combinations not excluded.

A mobile terminal used in the embodiments of the present invention may be a mobile terminal device that supports a CDMA communications standard and that has a mobile communications function, such as a mobile phone, a tablet computer, a personal digital assistant (Personal Digital Assistant, PDA for short), a point of sales (Point of Sales, POS for short), and a vehicle-mounted computer. This is not specifically limited in the embodiments of the present invention.

The CDMA communications standard in a CDMA communications network used in the embodiments of the present invention includes but is not limited to CDMA CDMA2000 1×, CDMA2000 2×, and CDMA2000 3×. The CDMA communications standard in the CDMA communications network used in the embodiments of the present invention does not include GSM (Global System of Mobile communication, Global System for Mobile Communications), WCDMA (Wideband Code Division Multiple Access, Wideband Code Division Multiple Access), Time Division-Synchronous Code Division Multiple Access (Time Division-Synchronous Code Division Multiple Access), and the like. Current CDMA-related standards are mainly formulated by the 3GPP2 (The 3rd Generation Partnership Project 2). The organization 3GPP2 was founded in January 1999, and was initiated by four standardization organizations: the TIA (USA), the ARIB (Japan), the TTC (Japan), and the TTA (South Korea). China Wireless Telecommunication Standard Group (CWTS) formally signed to join the 3GPP2 in South Korea in June 1999, and became a partner of this standardization organization that is mainly responsible for a third generation mobile communications technology CDMA2000. After China Communications Standards Association (CCSA) was founded, the CWTS was renamed CCSA in the organization 3GPP2.

Main work of the 3GPP2 is to formulate mobile communications technology specifications that are based on an ANSI-41 core network and in which CDMA2000 is used as a radio access network. Standard technology specifications include but are not limited to A.Sxxxx series, C.Sxxxx series, S.Sxxxx series, X.Sxxxx series, N.Sxxxx series, or the like, for example, 3GPP2 S.R0006-507-A.

It may be understood that the CDMA communications standard used in the embodiments of the present invention may not be limited to standards formulated by the 3GPP2, for example, may be another standard related to CDMA IS-95.

The mobile terminal used in the present invention may be a mobile phone. The following describes an embodiment of the present invention by using a mobile phone as an example.

It may be understood that, that a user A makes a call with a user B actually means that the user A uses a mobile phone A to make a call with a user B who uses a mobile phone B, and so on. The mobile phone A may also be referred to as a first terminal, the mobile phone B may also be referred to as a second terminal, and a mobile phone C may also be referred to as a third terminal.

When the mobile phone A and the mobile phone B are in a call state, if a call is received from the mobile phone C, a call voice of the mobile phone A is mixed up with a prompt tone "beep". The prompt tone "beep" is a prompt tone that is sent by a network device and that indicates that the mobile phone A has a second call. For details about a related mechanism for carrying a prompt tone of another call in a call voice, refer to related content in the 3GPP2 S.R0006-507-A standard, and no detailed description is given in this specification. The network device mixes the prompt tone with a call voice of the mobile phone B that is in a first call, and a base station forwards the prompt tone and the call voice to the mobile phone A, Therefore, a downlink signal received by the mobile phone A includes the prompt tone. The network device may be a core network device, for example, an MSC (Mobile Switching Center, mobile switching center). The prompt tone "beep" in this application may be referred to as a beep tone or a prompt tone for short.

If the user A cuts off the call from the mobile phone C (for example, the user A selects, on an operation interface of the mobile phone A, to reject to answer the call from the mobile phone C), a display screen of the mobile phone A no longer displays a call interface of the call from the mobile phone C. However, if the mobile phone C does not stop the call, the downlink signal received by the mobile phone A still includes the prompt tone. That is, the beep tone on the mobile phone A continues and does not disappear. According to a thorough analysis made by the inventor of this application, this is because a notification message for cutting off another call in a call state is not stipulated in the CDMA communications standard. That is, the user A may select, on a user interface of the mobile phone A, to cut off the call from the mobile phone C, but the mobile phone A does not send a notification message for cutting off the call from the mobile phone C to a network. If the mobile phone A sends a cut-off message to the network, the network also cuts off the call between the mobile phone A and the mobile phone B. This is certainly not what is expected by the user A.

In addition, when the mobile phone C calls the mobile phone A, if the mobile phone A is in a call state, the mobile phone C may receive a prompt that indicates that the mobile phone A is in a call state and that is sent by the network. If a user C learns that the mobile phone A is in a call state, the user C may actively abandon the call from the mobile phone C to the mobile phone A. In this case, the prompt tone of the second call on the mobile phone A disappears, but an interface prompting the call from the mobile phone C is still displayed on a screen of the mobile phone A. According to a thorough analysis made by the inventor of this application, after the mobile phone C abandons the call to the mobile phone A, the network no longer prompts that the mobile phone A has a second call, the downlink signal received by the mobile phone A no longer includes the prompt tone of the second call, and the beep tone on the mobile phone A disappears. However, although the network no longer prompts that the mobile phone A has a second call, the network does not send a notification message to notify the mobile phone A that the second call from the mobile phone C has been abandoned. Therefore, the mobile phone A does not know that the call from the mobile phone C has been cut off, and still displays the call interface of the mobile phone C on the display screen, and the user A can select, on the call interface on the display screen of the mobile phone A, to answer the call. In this case, although the mobile phone A selects to answer the call from the mobile phone C, a real call connection cannot be established between the mobile phone A and the mobile phone C, and the call between the mobile phone A and the mobile phone B is suspended. This is certainly not what is expected by the user A, either.

If the foregoing case occurs frequently or for multiple times on the mobile phone A, experience of the user A is certainly greatly affected.

Optionally, the foregoing problem may be resolved by improving a network communications standard. For example, when the mobile phone A is in a call with the mobile phone B, if the mobile phone A cuts off the second call from the mobile phone C, the mobile phone A sends a first notification message to a network (for example, a CDMA wireless communications network), so as to notify the network that the call from the mobile phone C has been cut off. After receiving the first notification message, the network no longer sends to the mobile phone A the prompt tone of the call from the mobile phone C. In addition, the network can correctly recognize the first notification message, and does not cut off the call between the mobile phone A and the mobile phone B. In this case, the network may also notify the mobile phone C that the call is rejected, and release a call connection established between the network and the mobile phone C.

Optionally, after the network receives a message indicating that the mobile phone C abandons the call to the mobile phone A, the network may send a second notification message to notify the mobile phone A that the second call from the mobile phone C has been abandoned. After receiving the second notification message, the mobile phone A may automatically eliminate the call interface of the second call on the display screen of the mobile phone A, and returns to an interface of the first call between the mobile phone A and the mobile phone B. This process does not require user intervention, thereby improving user experience.

The foregoing first notification message and the second notification message may be added communication messages, or the notification messages may be identified by using an undefined field or an extended field in an existing exchanged message. This is not limited in this embodiment of the present invention.

By resolving the foregoing problem by using the network communications standard improvement solution, impact on the call between the mobile phone A and the mobile phone B from the unconnected call of the mobile phone C can be eradicated. However, in implementation of the foregoing solution, existing communications standards for a mobile phone and a network device need to be updated.

An embodiment of the present invention further provides a call prompt method to resolve the foregoing problem. Based on a communications standard of an existing CDMA communications network, the method is used to improve a terminal side to resolve the foregoing problem in a voice call. The call prompt method used in this embodiment of the present invention is a policy in which when a terminal receives a call, a prompt tone is output to prompt the call and/or a display interface indicates the call.

Referring to FIG. 1, an embodiment of the present invention provides a schematic diagram of processing a downlink signal by a terminal. In a process in which a user A makes a call with a user B, after an antenna 111 receives a downlink signal, a mobile phone A performs channel decoding on the downlink signal by using a channel decoding module 310, and performs voice decoding on the downlink signal by using a voice decoding module 320, so as to obtain pulse code modulation (Pulse Code Modulation, PCM) data. The methods for channel decoding and voice decoding are mature signal processing algorithms in the field, and details are not described in this embodiment of the present invention. It may be understood that the channel decoding module 310 and the voice decoding module 320 may be implemented by using a software algorithm, and may be software modules in a processor.

After obtaining the PCM data by performing channel decoding and voice decoding on the downlink signal, the mobile phone A processes the PCM data by using a downlink call audio algorithm module 350, and then outputs a voice to the user. Specifically, the voice may be output to the user by using a receiver (Receiver, RCV) 562 or a microphone 562 that can output a voice, or may be output to the user by using a speaker 561 after the voice is amplified by using a power amplifier (Power Amplifier, PA) 163. Processing performed by the downlink call audio algorithm module 350 on the PCM data may include noise suppression (Noise Suppression, NS), automatic gain control (Automatic Gain Control, AGC), dynamic range compression (Dynamic range compression, DRC), equalization (equalization, EQ), bandwidth expansion (Bandwidth Expansion, BEW), or the like.

It may be understood that when the mobile phone A makes a call with a mobile phone B, an uplink voice signal processing process may be considered as an inverse process of downlink voice signal processing. Processing performed by the downlink call audio algorithm module on a collected voice signal may include one or more of multi-microphone pickup, the NS, the AGC, the DRC, or the EQ, but is not limited thereto. After the collected voice signal is processed by using an uplink call audio algorithm module, voice encoding and channel encoding are performed on the collected voice signal, and then the collected voice signal is sent to a base station by using the antenna 111 on the mobile phone. The base station forwards the collected voice signal to another network device.

The mobile phone A implements voice signal receiving and sending functions on a mobile phone by processing an uplink signal and a downlink signal, so as to implement a normal call.

Figure 2:
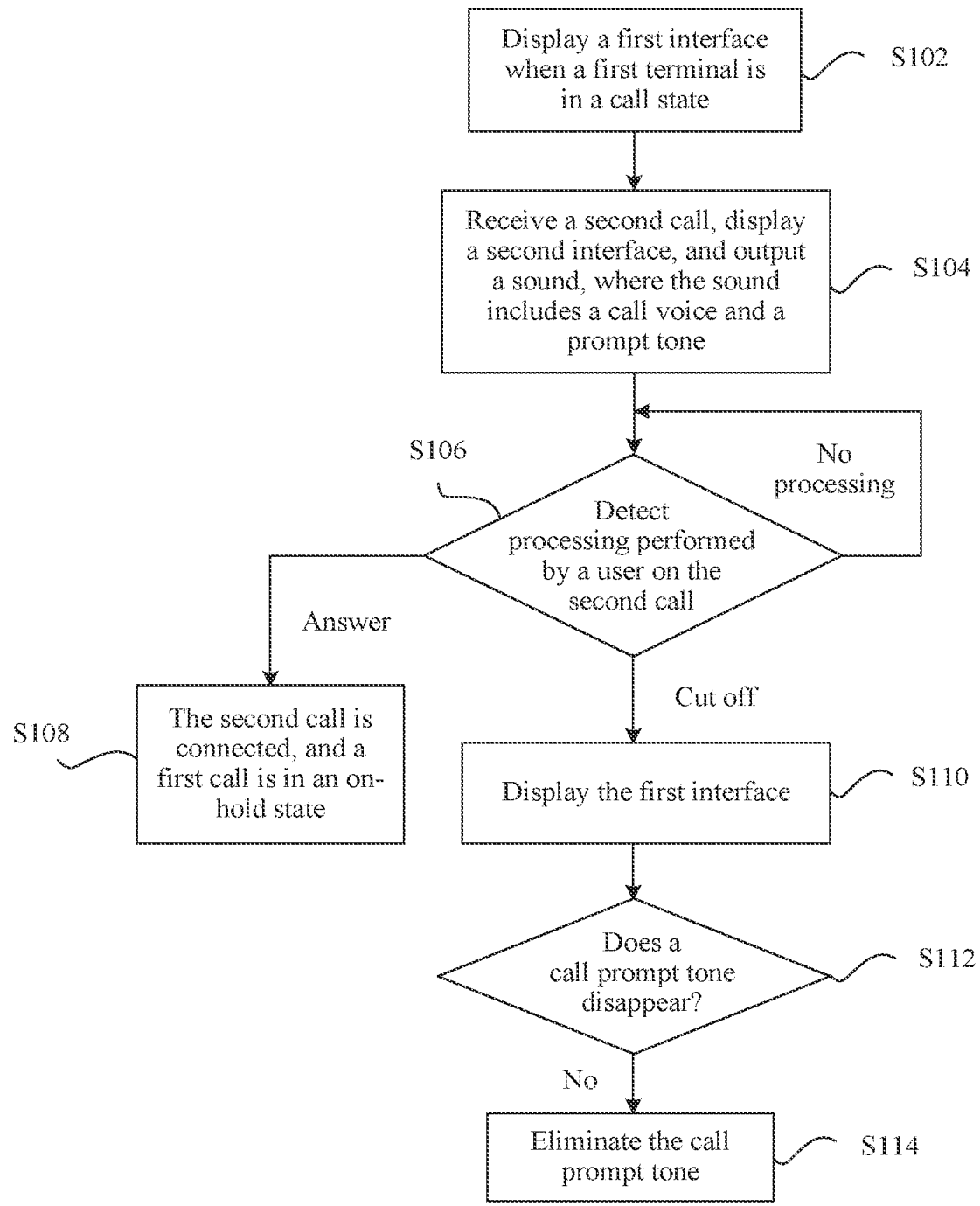
FIG. 2 is a schematic flowchart of a call prompt method disclosed in an embodiment of the present invention.

As shown in FIG. 2, an embodiment of the present invention discloses a call prompt method, so as to resolve the foregoing problem in an existing CDMA communications network. The method includes the following steps.

S102, When a mobile phone A is in a call state, display a first interface, where the first interface shows that the mobile phone A is in a call with a mobile phone B.

That the mobile phone A is in a call state means that the mobile phone A has established a first call with the mobile phone B. The first call may be triggered to be established when the mobile phone A calls the mobile phone B, or may be triggered to be established when the mobile phone A receives a call from the mobile phone B.

The mobile phone A interacts with a network by using a base station. The mobile phone A may receive, by using an antenna, a system broadcast message sent by the base station. The mobile phone A parses, based on a CDMA communications standard, the received system broadcast message, and may obtain information about a network that communicates with the mobile phone A, such as a home operator network and a network standard. The system broadcast message sent by the base station carries network information such as a home operator network and a cell ID, By parsing the received broadcast message, the mobile phone A can obtain the network information such as the home operator network and the network standard.

S104. If a second call is received, the mobile phone A displays a second interface on a display screen, where the second interface prompts that a mobile phone C initiates a call to the mobile phone A, and at this moment, the mobile phone A is still in a call with the mobile phone B; and the mobile phone A outputs a sound, where the sound includes a prompt tone and a call voice between the mobile phone A and the mobile phone B, the prompt tone is used to prompt a call event, and the call event indicates that the mobile phone C initiates a call to the mobile phone C.

If the second call from the mobile phone C is detected, the mobile phone A displays a call interface of the second call, that is, a second interface, on the display screen, and a user A hears a prompt tone "beep" while hearing a voice of a user B.

If the mobile phone C initiates the second call to the mobile phone A, a downlink signal received by the mobile phone A includes the call voice of the call between the mobile phone A and the mobile phone B, and the prompt tone of the second call initiated by the mobile phone C.

After the mobile phone A processes the received downlink signal by using a channel decoding module 310, a voice decoding module 320, and a downlink call audio algorithm module 350, a speaker 561 or a receiver 562 outputs the downlink signal.

S106. The mobile phone A detects processing by a user on the second call, and if the user answers the second call, perform step S108, or if the user cuts off the second call, perform step S110.

After receiving the second call, the mobile phone A may detect, in real time, whether the user A answers or cuts off the second call. If it is detected that the user A performs no operation on the second call, the second call is not processed. If the mobile phone A detects an operation performed by the user A on the second call, the mobile phone A is triggered to process the second call, and S108 or S110 is performed. The user A may perform an operation on the second call on the display screen of the mobile phone A, or may trigger an operation instruction in another manner, for example, by pressing a button that is used for implementing answering or cut-off. This is not limited in this embodiment of the present invention.

S108, If the mobile phone A detects that the user A answers the second call, the second call is connected, and the first call is cut off or is in an on-hold state.

S110. If the mobile phone A detects that the user A cuts off the second call, that is, the second call initiated by the mobile phone C is rejected, the mobile phone A displays the first interface that shows that the mobile phone A is in a call with the mobile phone B. In this case, the mobile phone A continues outputting the call voice between the first terminal and the second terminal, stops outputting the prompt tone to stop prompting the call event, so as to eliminate interference caused by the prompt tone to the first call in a timely manner. The mobile phone A stops outputting the prompt tone by eliminating the prompt tone in the downlink signal.

After the mobile phone A detects an indication indicating that the user cuts off the second call, the display screen of the mobile phone A no longer displays the second interface, and returns to the first interface.

When detecting that the user A cuts off the second call, the mobile phone A may perform S112 of determining whether the prompt tone disappears. If the prompt tone does not disappear, S114 of eliminating the prompt tone is performed. Alternatively, when detecting that the user A cuts off the second call, the mobile phone A may not determine whether the prompt tone disappears, that is, does not perform S112, and directly performs S114 of eliminating the prompt tone.

It may be understood that the mobile phone A constantly receives downlink signals sent by the network. Although prompt tones received by the mobile phone A may not be in a same downlink signal, prompt tones in a whole call process may be considered as a whole. For example, after receiving the second call, the mobile phone A outputs a sound, and the sound includes a prompt tone; and after the user A cuts off the second call, the mobile phone A eliminates the prompt tone. Herein, the prompt tone eliminated by the mobile phone A is a prompt tone detected after the user A cuts off the second call, instead of the prompt tone that has been output by the mobile phone A. Likewise, in this embodiment of the present invention, downlink signals in a process of the call between the mobile phone A and the mobile phone B may be considered as a whole.

Figure 3:
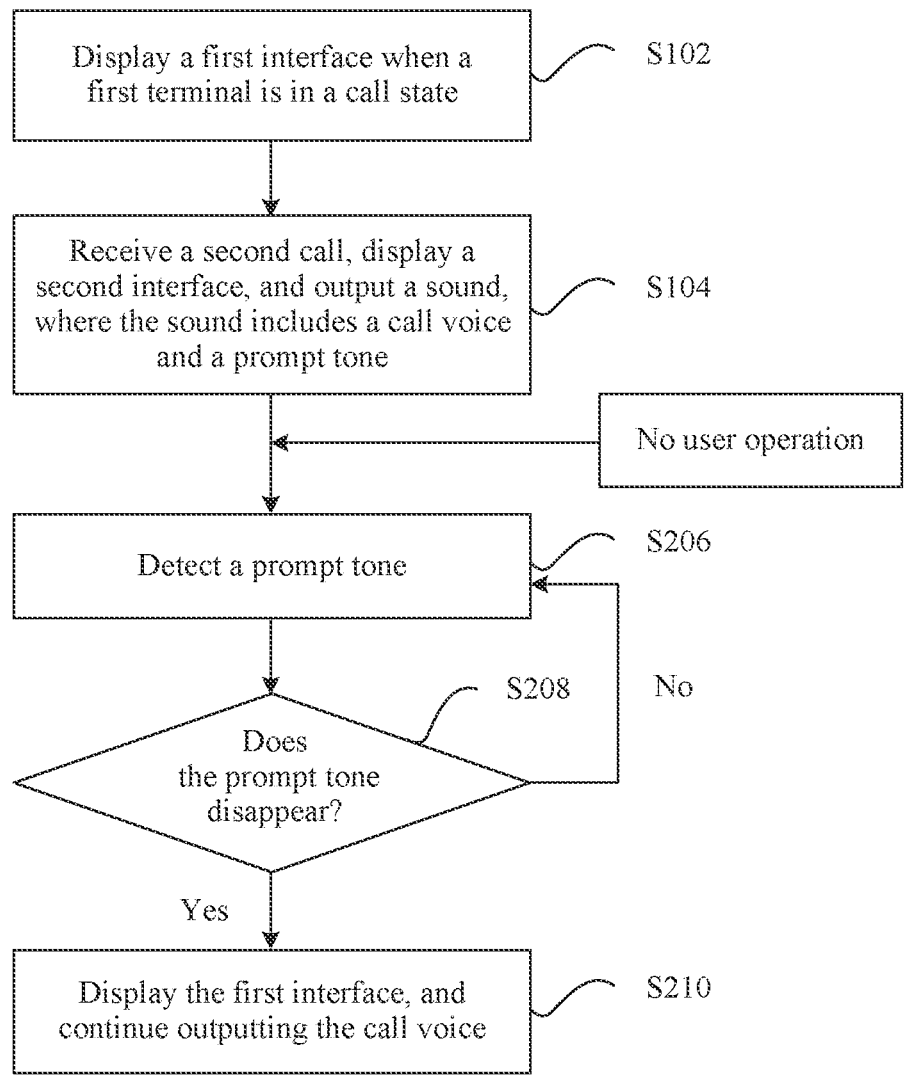
FIG. 3 is a schematic flowchart of another call prompt method disclosed in an embodiment of the present invention.

Referring to FIG. 3, an embodiment of the present invention further provides another call prompt method, so as to resolve the foregoing problem in an existing CDMA communications network. After the mobile phone A receives the second call initiated by the mobile phone C to the mobile phone A in FIG. 2 in S104, and the call prompt method provided in this embodiment of the present invention may further include the following steps.

S206. The mobile phone detects a prompt tone.

After receiving the second call, the mobile phone A detects, in real time, whether a received downlink signal includes a prompt tone.

S208. The mobile phone A determines whether the prompt tone disappears.

If the prompt, tone disappears before the user A selects whether to answer the second call, S210 is performed; or if the prompt tone does not disappear before the user A selects to answer the second call, whether the call voice includes a prompt tone continues to be detected.

After the mobile phone C initiates a call to the mobile phone A, the mobile phone C may abandon the call to the mobile phone A. If the mobile phone C abandons the initiated call, the mobile phone C sends a call abandoning notification message to the network. After the mobile phone C abandons the call, the network no longer sends the prompt tone of the second call to the mobile phone A, That is, the downlink signal received by the mobile phone A includes the call voice between the mobile phone A and the mobile phone B, but no longer includes the prompt tone of the second call. In this case, the mobile phone A detects no prompt tone. If the mobile phone A detects no prompt tone in N prompt tone detection periods, it may be determined that the prompt tone disappears, where N is a positive integer.

S210. The mobile phone A displays the first interface, and continues outputting the call voice between the first terminal and the second terminal. The first interface shows that the first terminal is in a call with the second terminal.

If the mobile phone A detects that the prompt tone disappears, or detects no prompt tone, the mobile phone A may consider that the mobile phone C has stopped initiating the call to the mobile phone C. In this case, the mobile phone A may display the first interface showing that the mobile phone A is in a call with the mobile phone B, instead of the second interface of the call initiated by the mobile phone C.

The mobile phone A is still in a call with the mobile phone B, and the downlink signal received by the mobile phone A includes the call voice between the mobile phone A and the mobile phone B. After processing the downlink signal, the mobile phone A may continue outputting the call voice between the mobile phone A and the mobile phone B.

It may be understood that the mobile phone A constantly receives downlink signals sent by the network. Although call voices received by the mobile phone A may not be in a same downlink signal, call voices in a whole call process may be considered as a whole.

Figure 4:
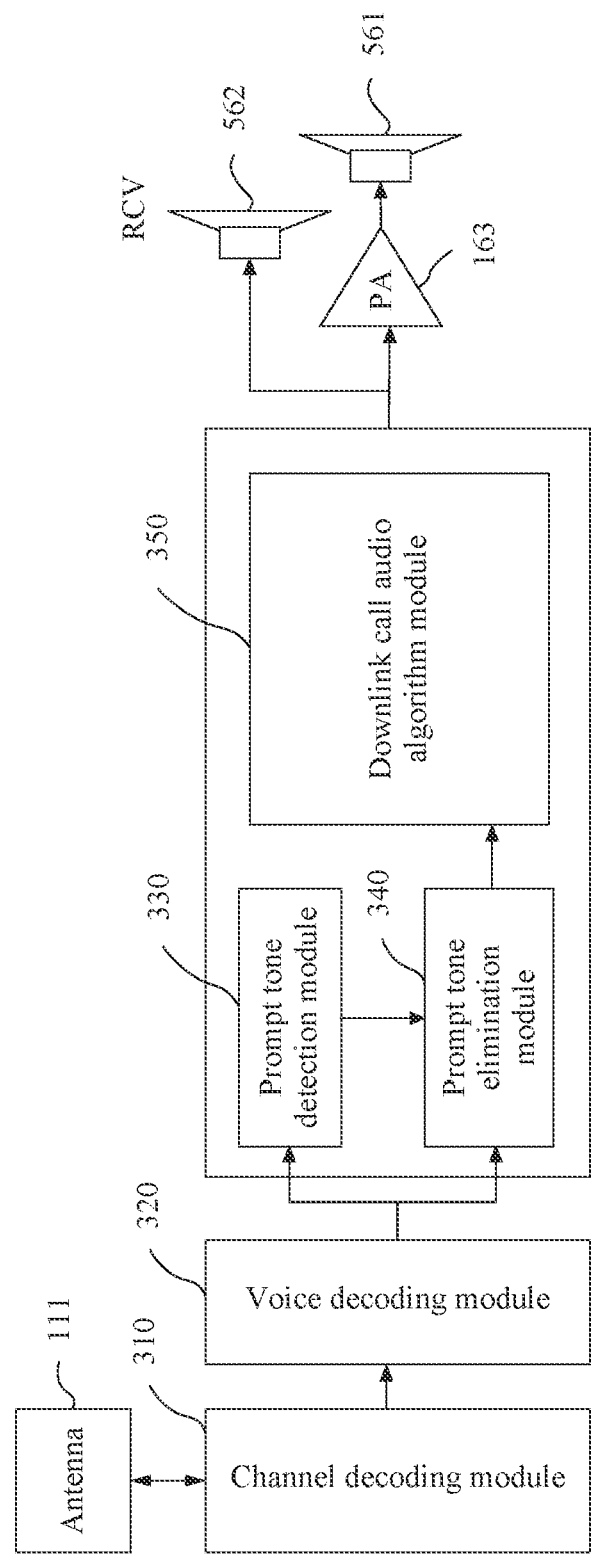
FIG. 4 is a schematic diagram of a prompt tone detection and elimination method disclosed in an embodiment of the present invention.
Figure 5:
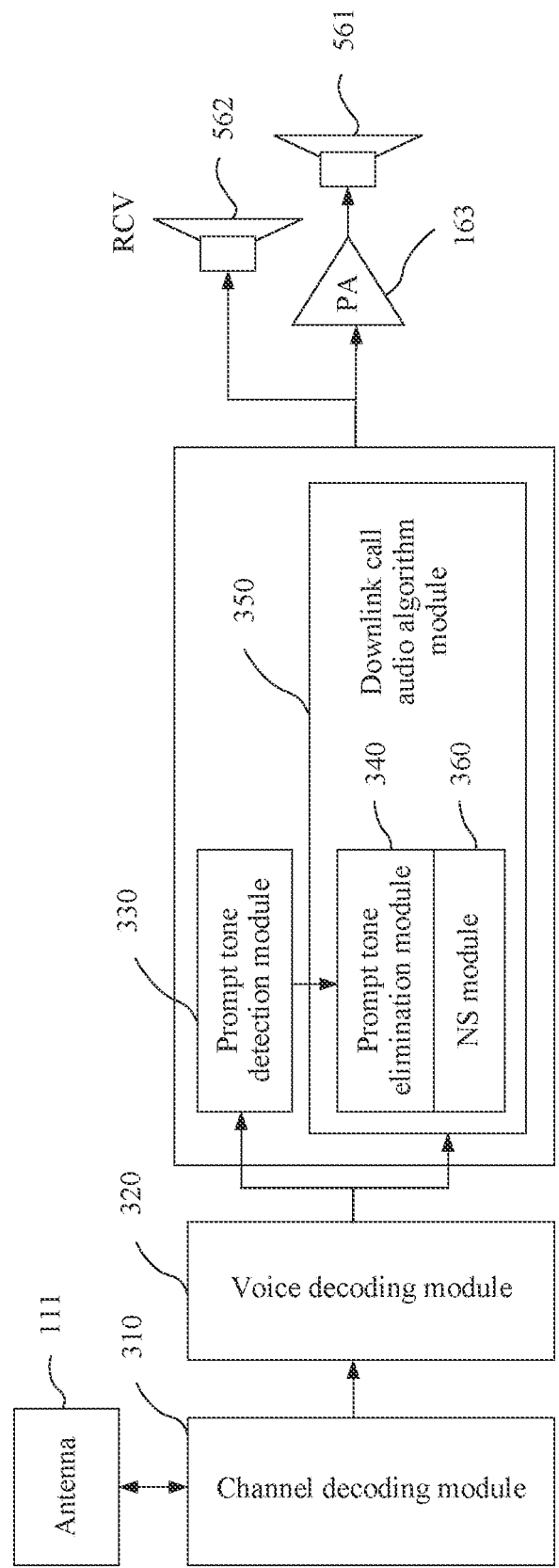
FIG. 5 is a schematic diagram of another prompt tone detection and elimination method disclosed in an embodiment of the present invention.

Referring to FIG. 4 and FIG. 5, embodiments of the present invention provide prompt tone detection and elimination methods, so as to further describe the methods shown in FIG. 2 and FIG. 3. FIG. 4 is an implementation of the method shown in FIG. 2, and FIG. 5 is an implementation of the method shown in FIG. 3. The mobile phone A may add a prompt tone detection module 330 and/or a prompt tone elimination module 340 following voice decoding. The prompt tone detection module 330 and the prompt tone elimination module 340 may be integrated into one module, or may be separate modules. Optionally, the prompt tone detection module 330 and the prompt tone elimination module 340 may be implemented by using a software algorithm. The prompt tone detection module 330 and the prompt tone elimination module 340 may be connected to the downlink call audio algorithm module 350 in series or in parallel. That is, after the PCM data is obtained by means of voice decoding, prompt tone detection may be first performed, and then processing based on a downlink call audio algorithm is performed. Alternatively, after the PCM data is obtained by means of voice decoding, prompt tone detection and processing based on a downlink call audio algorithm may be performed at the same time, so as to avoid or reduce a delay caused by the prompt tone detection to a downlink call in a normal voice state. The prompt tone elimination module 340 may also be integrated into a noise suppression NS module 360. To some extent, when the mobile phone A is in a call state, the prompt tone of the second call may also be considered as noise.

Optionally, the mobile phone A may detect a prompt tone by using a linear spectrum detection method in signal processing. Because a fundamental frequency of a beep tone is a single-frequency tone that lasts for a time period and that has a constant amplitude and a constant frequency, a frequency of a beep tone may be detected based on a time-frequency characteristic of the beep tone. After the frequency corresponding to the beep tone is detected, the prompt tone beep may be eliminated by changing an amplitude value that is corresponding to the frequency and that is in an amplitude spectrum.

Specifically, the following linear spectrum detection method may be used for prompt tone detection.

(1). The mobile phone A may parse, according to the CDMA communications standard, a system broadcast message of a current cell to obtain network information, and obtains, according to the network information, prompt tone information pre-stored in the mobile terminal. The network information may include a home operator network and a network standard, or may include information about another network, for example, information about a base station. This is not limited in the present invention. The pre-stored prompt tone information is corresponding to the network information. The pre-stored prompt tone information includes a spectrum structure of a prompt tone, that is, frequency distribution or a frequency range of the prompt tone, and a signal strength or amplitude of the prompt tone, and may further include a time interval of the prompt tone, or the like. The mobile phone A may detect, according to the pre-stored prompt tone information, a prompt tone included in a downlink signal. Because there is a difference between the pre-stored prompt tone information and an actual prompt tone, the mobile phone A may also use the obtained pre-stored prompt tone information as prior information for detecting a prompt tone included in the downlink signal. It may be understood that the downlink signal on which whether a prompt tone is included is detected may be PCM data obtained after channel decoding and voice decoding are performed.

(2). After receiving a downlink signal sent by a base station, the mobile phone A first performs channel decoding, and then performs source decoding, so as to obtain the PCM data.

(3). The PCM data is divided into multiple overlapping data frames. For example, decoded PCM data may be divided into multiple data frames of 20 ms with an overlapping rate of 50%. A specific quantity of data frames is related to a volume of the PCM data, an overlapping rate, and a length of each data frame. It may be understood that 50% and 20 ms herein are merely used as examples for description, and specific data may be determined according to an actual condition, or may be determined according to an actual measurement condition. For example, an overlapping rate may range from 25% to 75%, and a length of a data frame may range from 10 ms to 30 ms.

(4). Each of the data frames is multiplied by a window function, and then a Fourier transformation is performed to obtain a complex spectrum. The window function may include a common data window such as a Hanning (harming) window, a Hamming (hamming) window, and a triangular window. This is not limited in the present invention. A signal may be truncated, by using the window function, to a limited time period for analysis.

(5). At each pre-estimated frequency, a correlation coefficient ρ between complex spectra of a previous frame and a current frame is calculated in a relaxation period, so as to obtain a correlation coefficient estimate. The relaxation period may be set and adjusted according to an actual condition, for example, the relaxation period may be a value between 40 ms and 60 ms. A specific value of the relaxation period is not limited in the present invention.

In calculation based on a mathematical formula, a calculation method for the correlation coefficient is $$\rho_{XY} = \frac{Cov(X, Y)}{\sqrt{D(X)} \sqrt{D(Y)}}.$$

Cov(X, Y) is a covariance, D(X) is a variance of X and D(Y) is a variance of Y. $\rho_{XY} \in [0,1]$, and a larger value of $\rho_{XY}$ indicates a stronger correlation.

Therefore, once Fourier coefficients of two adjacent data frames are obtained and substituted into the variables X and Y, a correlation coefficient between complex spectra of the two adjacent data frames may be obtained by means of calculation.

Each pre-estimated frequency may be a frequency obtained according to the pre-stored prompt tone information in (1), may be a frequency that is obtained by performing sampling according to a set frequency range after an actual prompt tone is analyzed, or may be a frequency determined by analyzing a spectrum characteristic of a call voice signal. This is not limited in this embodiment of the present invention.

(6). If the correlation coefficient exceeds a preset threshold, it is determined that there is an obvious single-frequency tone signal at the frequency, that is, a beep tone. In addition, an amplitude spectrum estimate of the frequency may be multiplied by the correlation coefficient estimate to obtain a frequency amplitude estimate of the beep tone.

Optionally, the prior information of the beep tone in (1) may be compared with the frequency amplitude estimate of the beep tone that is obtained according to the correlation coefficient estimate, so as to further improve detection accuracy. If the frequency of the beep tone that is obtained according to the correlation coefficient estimate is distributed at a frequency on which main energy in the prior information of the beep tone is distributed, it may be further determined that the beep tone is distributed at the frequency obtained according to the correlation coefficient estimate.

(7). Beep tone detection is performed in real time according to the foregoing method; and if no beep tone is detected in a preset quantity of consecutive time intervals in which a beep tone normally appears, it may be determined that the beep tone disappears.

(1) is an optional step, that is, the solution can be implemented even without (1). In this case, the frequency determined in step (5) may be a frequency obtained by sampling from a preset frequency range at a preset time interval, or may be a frequency obtained by sampling from a pre-estimated frequency range obtained by means of preliminary analysis according to a characteristic of the received downlink signal.

If specific information of the beep tone pre-stored in the mobile phone A in (1) completely matches information of the beep tone carried in the downlink signal, after the PCM data is obtained, the beep tone does not need to be detected by using the foregoing linear spectrum detection method. The mobile phone A may determine the beep tone by detecting, at a pre-stored frequency, whether an amplitude value corresponding to the downlink signal exceeds an amplitude threshold or is the same as or close to a pre-stored signal strength or amplitude. That at the pre-stored frequency, the amplitude value corresponding to the downlink signal is close to the preset signal strength means that a difference between the amplitude value corresponding to the downlink signal and the preset signal strength does not exceed a threshold.

It may be understood that various linear spectrum detection methods in the signal processing field may be adjusted and improved according to a characteristic of the prompt tone, and then be used to detect a prompt tone. A method for detecting a prompt tone is not limited to the foregoing algorithm.

It may be understood that the mobile phone A may be one or more processors. The call prompt method may be implemented by using a processor in the mobile phone A, or by using a processor, a necessary auxiliary circuit, and a necessary auxiliary device (such as a radio frequency chip and a display screen), or by using a chip or a chip-set formed by multiple chips.

According to the foregoing call processing method, a problem that an unconnected second call causes interference to a current call of the mobile phone A can be resolved without changing an existing network architecture or an existing network communications standard. This is simpler, more convenient, and more cost-effective when compared with a solution in which a network communications standard is changed and an operator's network device is updated.

Figure 6:
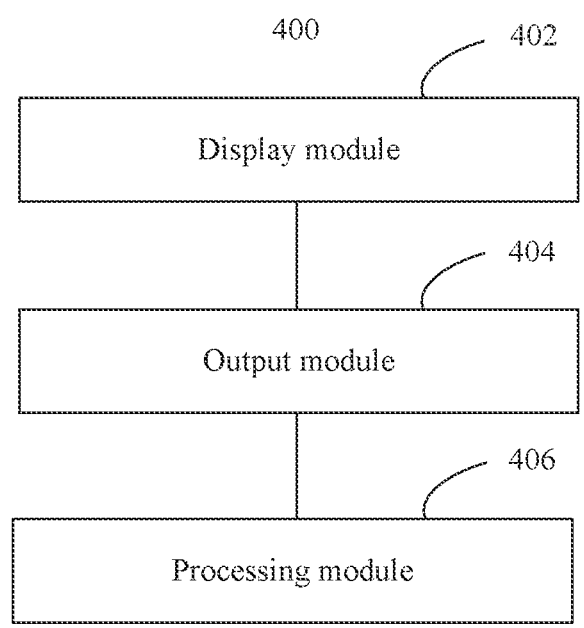
FIG. 6 is a schematic structural diagram of a terminal disclosed in an embodiment of the present invention.

Referring to FIG. 6, an embodiment of the present invention provides a terminal 400, so as to implement the methods in FIG. 2 and FIG. 3. All the solutions and features that can be implemented in FIG. 2 and FIG. 3 are applicable to this embodiment, and details are not described herein again.

Specifically, the terminal 400 may include:

a display module 402, configured to display a first interface, where the first interface shows that the terminal is in a call with a second terminal, where the display module 402 is further configured to display a second interface, where the second interface prompts that a third terminal initiates a call to the terminal, and at this moment, the terminal is still in a call with the second terminal;

an output module 404, configured to output a sound, where the sound includes a prompt tone and a call voice between the terminal and the second terminal, and the prompt tone is used to prompt that the third terminal initiates a call to the terminal; and a processing module 406, configured to detect whether the call initiated by the third terminal to the terminal is rejected.

The processing module 406 is further configured to detect whether the third terminal stops initiating the call to the terminal.

The output module 404 is further configured to: when the processing module 406 detects that the call initiated by the third terminal to the terminal is rejected, continue outputting the call voice between the terminal and the second terminal, and stop outputting the prompt tone to stop prompting the call event; or when the processing module 406 detects that the third terminal stops initiating the call to the terminal, continue outputting the call voice between the first terminal and the second terminal.

The display module 402 is further configured to: when the processing module 406 detects that the third terminal stops initiating the call to the terminal, and the output module 404 continues outputting the call voice between the first terminal and the second terminal, stop displaying the second interface, and display the first interface.

The processing module 406 may be configured to detect the prompt tone.

Optionally, the processing module 406 determines, by detecting that the prompt tone disappears, that the third terminal stops initiating the call to the first terminal. For example, if the processing module detects no prompt tone in N prompt tone detection periods, it is determined that the prompt tone disappears, where N is a positive integer.

Optionally, the output module 404 may stop outputting the prompt tone by changing an amplitude value of a frequency corresponding to the prompt tone.

For a specific method used by the processing module 406 to detect a prompt tone, refer to related description of the methods in FIG. 3 and FIG. 4, and details are not described herein again.

The terminal 400 may be configured to implement the call prompt methods in FIG. 2 and FIG. 3, including the solutions in FIG. 4 and FIG. 5 that are further described for the call prompt methods in FIG. 2 and FIG. 3. Therefore, all the solutions and features in the methods disclosed in the embodiments of the present invention are applicable to the terminal 400 shown in FIG. 4, and details are not described herein again.

Optionally, the display module 402 of the terminal 400 may be a display screen of the terminal, the processing module 406 may be a processor of the terminal, and the output module may be an audio frequency circuit of the terminal. This is not limited in the present invention.

The terminal 400 can resolve a problem that an unconnected second call causes interference to a current call without changing an existing network architecture or an existing network communications standard. This is simpler, more convenient, and more cost-effective when compared with a solution in which a network communications standard is changed and an operator's network device is updated.

Figure 7:
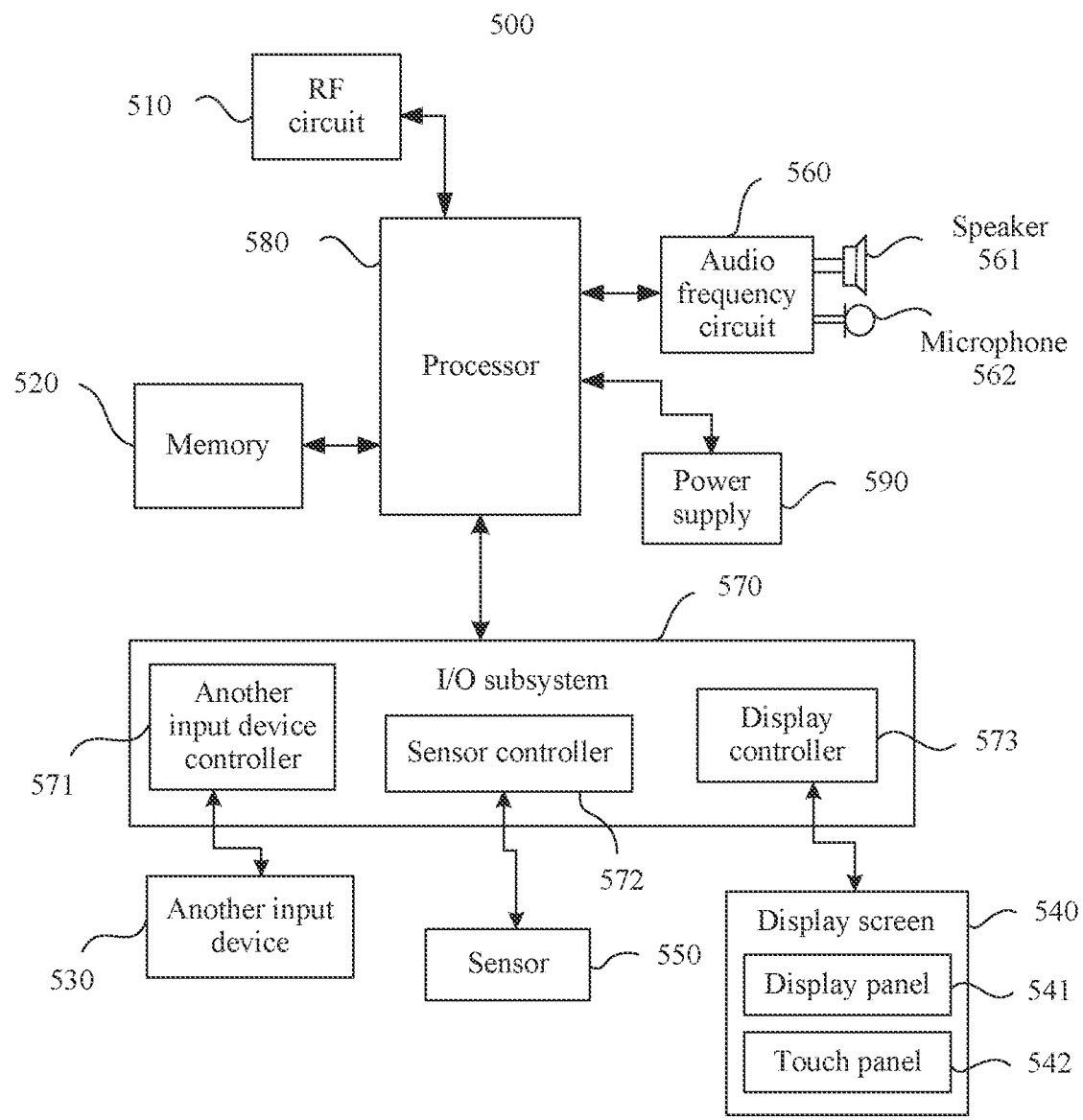
FIG. 7 is a schematic structural diagram of another terminal disclosed in an embodiment of the present invention.

Referring to FIG. 7, the present invention further provides a terminal 500 that implements the method provided in the embodiments of the present invention, so as to execute the foregoing call prompt call methods in FIG. 2 and FIG. 3.

FIG. 7 shows a block diagram of a partial structure of a terminal 500 related to this embodiment of the present invention. Referring to FIG. 7, the terminal 500 includes components such as an RF (Radio Frequency, radio frequency) circuit 510, a memory 520, another input device 530, a display screen 540, a sensor 550, an audio frequency circuit 560, an I/O subsystem 570, a processor 580, and a power supply 590. A person skilled in the art may understand that the structure of the mobile terminal shown in FIG. 7 constitutes no limitation to the mobile terminal; that is, more or fewer components than those shown in the figure may be included, some components may be combined, or some components may be separated, or the components are arranged in a different way.

The following describes all constituent components of the terminal 500 in detail with reference to FIG. 7.

The RF circuit 510 may be configured to receive or send a signal in an information receiving or sending process or a call process; particularly, after receiving downlink information of a base station, send the downlink information to the processor 580 for processing; and send designed uplink data to the base station. Generally, the RF circuit 510 includes but is not limited to an antenna, at least one amplifier, a transceiver; a coupler, an LNA (Low Noise Amplifier, low noise amplifier), a duplexer, and the like. In addition, the RF circuit 510 may further communicate with a network and another device by means of wireless communications. The wireless communications uses a CDMA communications standard or protocol for communication, and may further use any one of the following communications standards or protocols, including but not limited to: GSM (Global System of Mobile communication, Global System for Mobile communications), GPRS (General Packet Radio Service, General Packet Radio Service), WCDMA (Wideband Code Division Multiple Access, Wideband Code Division Multiple Access), LTE (Long Term Evolution, Long Term Evolution), or the like. The CDMA communications standard is a telecom CDMA communications standard, including but not limited to CDMA IS-95, CDMA2000 1×, CDMA2000 2×, and CDMA2000 3×.

The memory 520 may be configured to store a software program and a module, and the processor 580 executes various functional applications of the terminal 500 and data processing by running the software program and the module stored in the memory 520. The memory 520 may mainly include a program storage area and a data storage area. The program storage area may store an operating system, an application program (such as a sound playing function or an image playing function) that is required by at least one function, and the like. The data storage area may store data (such as audio data or a phonebook) that is created according to use of the terminal 500, and the like. In addition, the memory 520 may include a high-speed random access memory, and may further include a non-volatile memory, such as at least one magnetic disk storage device, a flash memory device, or another volatile solid-state storage device.

The another input device 530 may be configured to receive numerical or character information that is input, and generate signal input related to user settings and function control of the terminal 500. Specifically, the another input device 530 may include but not limited to one or more of: a physical keyboard, a function button (such as a volume control button or an on/off button), a trackball, a mouse, and a joystick, an optical mouse (the optical mouse is an extension to a touch-sensitive surface that does not display visual output, or an extension to a touch-sensitive surface formed by a touchscreen). The another input device 530 is connected to another input device controller 571 of the I/O subsystem 570, and exchanges a signal with the processor 580 under control of the another input device controller 571.

The display screen 540 may be configured to display information entered by a user or information provided for a user, and various menus on the terminal 500, and may further receive user input. Specifically, the display screen 540 may include a display panel 541 and a touch panel 542. The display panel 541 may be configured in a form of an LCD (Liquid Crystal Display, liquid crystal display), an OLED (Organic Light-Emitting Diode, organic light-emitting diode), or the like. The touch panel 542, also referred to as a touchscreen or a touch-sensitive screen, can collect a contact or contactless operation performed by a user on or near the touch panel 542 (for example, an operation performed by the user on or near the touch panel 542 by using any appropriate object or accessory, such as a finger or a stylus, or a somatosensory operation may be included, where the operation includes operation types such as a single-point control operation and a multi-point control operation), and can drive a corresponding connection apparatus according to a preset program. Optionally, the touch panel 542 may include two parts: a touch detection apparatus and a touch controller. The touch detection apparatus detects a touch position and a touch gesture of the user, detects a signal brought by a touch operation, and transfers the signal to the touch controller. The touch controller receives touch information from the touch detection apparatus, converts the touch information into information that can be processed by the processor, and then sends the information to the processor 580, and can receive and execute a command sent by the processor 580. In addition, the touch panel 542 may be implemented by using multiple types such as a resistive type, a capacitive type, infrared, and a surface acoustic wave, or the touch panel 542 may be implemented by using any technology developed in the future. Further, the touch panel 542 may cover the display panel 541, and a user may perform an operation on or near the touch panel 542 covered on the display panel 541 according to content displayed on the display panel 541 (the displayed content includes but is not limited to a soft keyboard, a virtual mouse, a virtual key, and an icon). After detecting the operation performed on or near the touch panel 542, the touch panel 542 transfers the operation to the processor 580 by using the I/O subsystem 570, so as to determine user input; and subsequently the processor 580 provides corresponding visual output on the display panel 541 by using the I/O subsystem 570 according to the user input. Although the touch panel 542 and the display panel 541 in FIG. 7 are used as two independent components to implement input and input functions of the terminal 500, in some embodiments, the touch panel 542 and the display panel 541 may be integrated to implement the input and output functions of the terminal 500.

The terminal 500 may further include at least one type of sensor 550, such as a light sensor, a motion sensor; or another sensor. Specifically, the light sensor may include an ambient light sensor and a proximity sensor. The ambient light sensor may adjust luminance of the display panel 541 according to brightness or dimness of ambient light. The proximity sensor may turn off the display panel 541 and/or backlight when the terminal 500 moves close to an ear. As a type of the motion sensor, an accelerometer sensor may detect an acceleration value in each direction (generally, three axes), and detect a value and a direction of gravity when the accelerometer sensor is still, and may be used in an application for recognizing a mobile terminal posture (such as screen switching between landscape and portrait modes, a related game, or magnetometer posture calibration), a function related to vibration recognition (such as a pedometer or a knock), and the like. For other sensors that may also be configured on the terminal 500, such as a gyroscope, a barometer, a hygrometer, a thermometer, and an infrared sensor, details are not described herein.

The audio frequency circuit 560, a speaker 561, and a microphone 562 may provide an audio interface between a user and the terminal 500. The audio frequency circuit 560 may transmit, to the speaker 561, a signal converted from received audio data, and the speaker 561 converts the signal into a sound signal for output. In addition, the microphone 562 converts a collected sound signal into a signal; and after being received by the audio frequency circuit 560, the signal is converted into audio data, and then the audio data is output to an RI; circuit 108 for sending to, for example, another mobile terminal, or the audio data is output to the memory 520 for further processing.

The I/O subsystem 570 is configured to control external input and output external devices, and may include another input device controller 571, a sensor controller 572, and a display controller 573. Optionally, one or more other input control device controllers 571 receive a signal from the another input device 530 or send a signal to the another input device 530. The another input device 530 may include a physical button (such as a press button or a rocker button), a dial, a slider switch, a joystick, a click wheel, an optical mouse (the optical mouse is an extension to a touch-sensitive surface that does not display visual output, or an extension to a touch-sensitive surface formed by a touchscreen). It should be noted that the another input control device controller 571 may be connected to any one or more of the foregoing devices. The display controller 573 in the I/O subsystem 570 receives a signal from the display screen 540 and/or sends a signal to the display screen 540. After the display screen 540 detects user input, the display controller 573 converts the detected user input into interaction with a user interface object displayed on the display screen 540, so as to implement man-machine interaction. The sensor controller 572 may receive a signal from one or more sensors 550 and/or send a signal to one or more sensors 550.

As a control center of the terminal 500, the processor 580 connects all parts of the entire mobile terminal by using various interfaces and lines, and performs various functions of the terminal 500 and data processing by running or executing the software program and/or the module that are/is stored in the memory 520 and by invoking data stored in the memory 520, so as to perform overall monitoring on the mobile terminal. Optionally, the processor 580 may include one or more processing modules. Preferably, the processor 580 may integrate an application processor and a modem processor. The application processor mainly processes an operating system, a user interface; an application program, and the like, and the modem processor mainly processes wireless communications. It may be understood that the foregoing modem processor may be not integrated into the processor 580.

The terminal 500 further includes the power supply 590 (for example, a battery) that supplies power to each component. Preferably, the power supply may be logically connected to the processor 580 by using a power supply management system, so as to implement functions such as management of charging, discharging, and power consumption by using the power supply management system.

Although not shown in the figure, the terminal 500 may further include a camera, a Bluetooth module, a Wireless Fidelity (Wireless-Fidelity, Wi-Fi or WiFi) module, and the like, which are not described herein.

FIG. 7 is a block diagram of a generic structure of a mobile terminal. It may be understood that different mobile terminals may include more or fewer structures than that in FIG. 7. For example, the mobile terminal may further include a structure such as a Bluetooth module, a Wi-Fi module, or an infrared module.

Specifically, the RF circuit 510, which may be referred to as a transceiver, may be configured to communicate with a network device; and the processor 580 may invoke one or more programs stored in the memory 520, so as to perform the following operations:

displaying a first interface on the display screen 540, where the first interface shows that the terminal is in a call with a second terminal:

displaying a second interface on the display screen 540, where the second interface prompts that a third terminal initiates a call to the terminal, and at this moment, the terminal is still in a call with the second terminal;

outputting, on the terminal, a sound, where the sound includes a prompt tone and a call voice between the terminal and the second terminal, and the prompt tone is used to prompt that the third terminal initiates a call to the terminal; and if the call initiated by the third terminal to the terminal is rejected, continuing outputting, on the terminal, the call voice between the terminal and the second terminal, and stopping outputting the prompt tone; and/or if the third terminal stops initiating the call to the terminal, displaying the first interface on the display screen of the terminal, and continuing outputting, on the terminal, the call voice between the terminal and the second terminal.

For prompt tone detection and elimination methods, refer to description in the method embodiments, and details are not described herein again.

It may be understood that the processor may include multiple processor chips. For example, one processor chip processes prompt tone detection and/or elimination, and another processor chip processes another operation used for implementing the solution. An example is merely used for description herein, and all other solutions of similar principles belong to the scope of the embodiments of the present invention.

It should be noted that in a specific implementation process, a person skilled in the art should understand that in addition to the structure shown in FIG. 7, the terminal 500 further includes another device required for normal running. Furthermore, a person skilled in the art should understand that, according to a specific requirement, the terminal 500 may further include a hardware device that implements another additional function. In addition, a person skilled in the art should understand that the terminal 500 may also include only a device required for implementing this embodiment of the present invention, without a need of including all devices shown in FIG. 7.

The terminal 500 can resolve a problem that an unconnected second call causes interference to a current call of the terminal without changing an existing network architecture or an existing network communications protocol. This is simpler, more convenient, and more cost-effective when compared with a solution in which a network communications standard is changed and an operator's network device is updated.

It should be noted that the terminal that implements the call prompt method in this embodiment of the present invention may also be a processor, may be a processor, a necessary auxiliary circuit, and a necessary auxiliary device (such as a display screen and a speaker), or may be a chip or a chip-set formed by multiple chips.

An embodiment of the present invention further provides a processor, so as to implement the methods in FIG. 2 and FIG. 3 in the embodiments of the present invention. All the solutions and features that can be implemented in FIG. 2 and FIG. 3 are applicable to this embodiment, and details are not described herein again.

The processor may be configured to perform the following operations:

controlling to display a first interface, where the first interface shows that the terminal is in a call with a second terminal;

controlling to display a second interface, where the second interface prompts that a third terminal initiates a call to the terminal, and at this moment, the terminal is still in a call with the second terminal;

outputting a sound, where the sound includes a prompt tone and a call voice between the terminal and the second terminal, and the prompt tone is used to prompt that the third terminal initiates a call to the terminal;

if the call initiated by the third terminal to the terminal is rejected, continuing outputting the call voice between the terminal and the second terminal, and stopping outputting the prompt tone; and/or if the third terminal stops initiating the call to the terminal, controlling to display the first interface, and continuing outputting, on the terminal, the call voice between the terminal and the second terminal.

It may be understood that the operations of the processor are described from a perspective of the processor. When displaying the first interface, the second interface, or the like, the processor needs to use at least the display screen to display information, and another necessary auxiliary circuit to transmit the information. The information includes but is not limited to data, a message, a value, a parameter, an instruction, or signaling. When outputting the sound or the like, the processor needs to use at least an audio frequency circuit to output voice information. When making a call, receiving the second call, or the like, the processor also needs to use a transceiver to interact with a network. However, if the processor integrates an RF circuit, that is, the processor integrates an AP function and a BP function, the processor may not use another modem (Modem), but still needs to control an antenna to send and receive signals. The processor may invoke program information stored in the processor to implement the method in the embodiments of the present invention, or the processor may use information stored in a memory to implement the method in the embodiments of the present invention.

Optionally, detection of the foregoing prompt tone may be implemented by the processor. To improve a processing speed, the processor may also control a DSP (Digital Signal Processor, digital signal processor) to detect the prompt tone. Then the processor performs corresponding processing according to a detection result of the DSP. Likewise, the processor may also control the DSP to eliminate the prompt tone. For specific prompt tone detection and elimination methods, refer to detailed description of the methods shown in FIG. 2 and FIG. 3, and details are not described herein again.

It may be understood that the processor needs to use another auxiliary component to implement the call prompt solution in the embodiments of the present invention, and the another auxiliary component is controlled by the processor to assist in implementing the solution. Therefore, the call prompt method in the embodiments of the present invention may be considered to be directly implemented by the processor.

It should be understood that in the embodiment of the present invention, the processor may be a central processing unit (Central Processing Unit, "CPU" for short), or the processor may be another general purpose processor, a digital signal processor (DSP), an application-specific integrated circuit (ARC), a field programmable gate array (FPGA), or another programmable logic device, discrete gate or transistor logic device, discrete hardware component, or the like. The general purpose processor may be a microprocessor, or may be any conventional processor or the like.

It should be noted that, in all the embodiments of this specification, the mobile terminal generally includes at least one processor (for example, a CPU), at least one transceiver, and at least one bus, as shown in FIG. 7. As a control center of the electronic device, the processor connects all parts of the entire electronic device by using various interfaces and lines, and performs various functions of the electronic device and/or data processing by running or executing a software program and/or a module stored in a storage unit and by invoking data stored in the storage unit. The processor may be formed by an integrated circuit (Integrated Circuit, IC for short), for example, may be formed by a singly-encapsulated IC, or may be formed by multiple connected encapsulated ICs with a same function or different functions. For example, the processor may include only a central processing unit (Central Processing Unit, CPU for short), or may be a combination of a GPU, a digital signal processor (Digital Signal Processor, DSP for short), and a control chip (such as a baseband chip) in a communications unit. In an implementation of the present invention, the CPU may be a single computing core, or may include multiple computing cores.

A hardware structure shown in FIG. 7 and the foregoing description are applicable to various mobile terminals provided in the embodiments of the present invention. A person of ordinary skill in the art may understand that all or some of the steps of the foregoing methods may be implemented by a program instructing relevant hardware. The program may be stored in a computer readable storage medium. The storage medium includes: a ROM, a RAM, and an optical disc.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A call prompt method in a Code Division Multiple Access (CDMA) communication network, comprising:
    displaying a first interface on a display screen of a first terminal, wherein the first interface shows that the first terminal is in a call with a second terminal via the CDMA communication network;
    while the first terminal is in the call with the second terminal, displaying a second interface on the display screen of the first terminal, wherein the second interface prompts that a third terminal is initiating a call to the first terminal via the CDMA communication network;
    outputting, on the first terminal, a sound, wherein the sound comprises a prompt tone and a call voice between the first terminal and the second terminal, the prompt tone is used to prompt a call event, and the call event indicates that the third terminal is initiating the call to the first terminal via the CDMA communication network;
    while outputting the sound, determining, by the first terminal, that the call initiated by the third terminal to the first terminal is rejected by a user of the first terminal; and
    in response to determining that the call initiated by the third terminal to the first terminal is rejected by the user of the first terminal, continuing output, on the first terminal, the call voice between the first terminal and the second terminal, and stopping output, on the first terminal, the prompt tone to stop prompting the call event.

2. The method according to claim 1, wherein the first terminal receives the sound from the CDMA communication network, and stopping output, on the first terminal, the prompt tone comprises changing, in the received sound, an amplitude value of a frequency corresponding to the prompt tone.

3. The method according to claim 2, further comprising detecting, by the first terminal, the prompt tone by using a linear spectrum detection method.

4. The method according to claim 3, wherein a fundamental frequency of the prompt tone is a single-frequency tone that has a constant amplitude and a constant frequency; and
    detecting, by the first terminal, the prompt tone by using the linear spectrum detection method comprises:
        performing, by the first terminal, channel decoding and voice decoding on a received downlink signal to obtain pulse code modulation (PCM) data;
        dividing the PCM data into multiple overlapping data frames;
        multiplying each of the multiple data frames by a window function, and performing a Fourier transformation to obtain a complex spectrum;
        calculating, at each pre-estimated frequency, a correlation coefficient between complex spectra of a previous frame and a current frame in a relaxation period; and
        determining, by the first terminal, that the prompt tone is detected on a corresponding frequency in response to the correlation coefficient exceeding a preset threshold.

5. The method according to claim 4, further comprising:
    after the first terminal receives the call initiated by the third terminal, obtaining, according to network information obtained by the first terminal by parsing a system broadcast message of a current cell, prompt tone information pre-stored in the first terminal, and detecting a prompt tone in the downlink signal according to the pre-stored prompt tone information; and
    after determining, by the first terminal, that the prompt tone is detected on the corresponding frequency:
        comparing a frequency and an amplitude of the detected prompt tone with a frequency and an amplitude in the prompt tone information pre-stored in the first terminal; and in response to either determining that the frequency and the amplitude of the detected prompt tone are the same as the frequency and the amplitude in the prompt tone information pre-stored in the first terminal, or determining that differences between the frequency and the amplitude of the detected prompt tone and the frequency and the amplitude in the prompt tone information pre-stored in the first terminal do not exceed comparison thresholds, determining, by the first terminal, that the prompt tone is detected.

6. A first terminal used in a Code Division Multiple Access (CDMA) communication network, comprising at least one processor, a transceiver, one or more memories, a display screen, an audio frequency circuit, and a bus, wherein:
the transceiver is configured to communicate with the CDMA communication network;
the display screen is configured to display a first interface and a second interface;
the audio frequency circuit is configured to output a sound; and
the one or more memories coupled to the at least one processor and storing programming instructions for execution by the at least one a processor to perform operations comprising:
displaying a first interface on a display screen, wherein the first interface shows that the first terminal is in a call with a second terminal via the CDMA communication network;
while the first terminal is in the call with the second terminal, displaying a second interface on the display screen, wherein the second interface prompts that a third terminal is initiating a call to the first terminal via the CDMA communication network;
instructing the audio frequency circuit to output the sound, wherein the sound comprises a prompt tone and a call voice between the first terminal and the second terminal, the prompt tone is used to prompt a call event, and the call event indicates that the third terminal is initiating the call to the first terminal via the CDMA communication network;
while instructing the audio frequency circuit to output the sound, determining that the call initiated by the third terminal to the first terminal is rejected by a user of the first terminal; and
in response to determining that the call initiated by the third terminal to the first terminal is rejected by the user of the first terminal, instructing the audio frequency circuit to continue outputting the call voice between the first terminal and the second terminal, and to stop outputting the prompt tone to stop prompting the call event.

7. The first terminal according to claim 6, wherein the first terminal receives the sound from the CDMA communication network, and instructing the audio frequency circuit to stop outputting the prompt tone comprises changing, in the received sound, an amplitude value of a frequency corresponding to the prompt tone.

8. The first terminal according to claim 7, wherein the first terminal detects the prompt tone in the received sound by using a linear spectrum detection method.

9. The first terminal according to claim 8, wherein a fundamental frequency of the prompt tone is a single-frequency tone that has a constant amplitude and a constant frequency, and the operations further comprise:

performing channel decoding and voice decoding on a received downlink signal to obtain pulse code modulation (PCM) data;
dividing the PCM data into multiple overlapping data frames;
multiplying each of the multiple data frames by a window function, and performing a Fourier transformation to obtain a complex spectrum;
calculating, at each pre-estimated frequency, a correlation coefficient between complex spectra of a previous frame and a current frame in a relaxation period; and
determining, by the first terminal, that the prompt tone is detected on a corresponding frequency in response to the correlation coefficient exceeding a preset threshold.

10. The first terminal according to claim 9, wherein the operations further comprise:
after the first terminal receives the call initiated by the third terminal, obtaining, according to network information obtained by the first terminal by parsing a system broadcast message of a current cell, prompt tone information pre-stored in the first terminal, and detecting a prompt tone in the downlink signal according to the pre-stored prompt tone information; and
after determining, by the first terminal, that the prompt tone is detected on the corresponding frequency:
comparing a frequency and an amplitude of the detected prompt tone with a frequency and an amplitude in the prompt tone information pre-stored in the first terminal; and
in response to either determining that the frequency and the amplitude of the detected prompt tone are the same as the frequency and the amplitude in the prompt tone information pre-stored in the first terminal, or determining that differences between the frequency and the amplitude of the detected prompt tone and the frequency and the amplitude in the prompt tone information pre-stored in the first terminal do not exceed comparison thresholds, determining, by the first terminal, that the prompt tone is detected.

11. At least one processor used in a Code Division Multiple Access (CDMA) communication network in a first terminal, wherein the at least one processor is coupled to one or more memories that store programming instructions, and the programming instructions, when executed by the at least one processor, cause the at least one processor to perform operations comprising:
establishing, through a transceiver, a call with a second terminal via the CDMA communication network;
receiving, through the transceiver, a message from the CDMA communication network, wherein the message indicates that a third terminal is initiating a call to the first terminal via the CDMA communication network, and at this moment, the first terminal is still in the call with the second terminal;
outputting, through an audio frequency circuit, a sound, wherein the sound comprises a prompt tone and a call voice between the first terminal and the second terminal, the prompt tone is used to prompt a call event, and the call event indicates that the third terminal is initiating the call to the first terminal via the CDMA communication network;
while outputting, through the audio frequency circuit, the sound, determining that the call initiated by the third terminal to the first terminal is rejected by a user of the first terminal; and in response to determining that the call initiated by the third terminal to the first terminal is rejected by the user of the first terminal, continuing output, on the first terminal through the audio frequency circuit, the call voice between the first terminal and the second terminal, and stopping output, on the first terminal through the audio frequency circuit, the prompt tone to stop prompting the call event.

12. The at least one processor according to claim 11, wherein the at least one processor receives, through the transceiver, the sound from the CDMA communication network, and stopping output, on the first terminal through the audio frequency circuit, the prompt tone comprises changing, in the received sound, an amplitude value of a frequency corresponding to the prompt tone.

13. The at least one processor according to claim 12, wherein the at least one processor detects the prompt tone in the received sound by using a linear spectrum detection method.

14. The at least one processor according to claim 13, wherein a fundamental frequency of the prompt tone is a single-frequency tone that has a constant amplitude and a constant frequency, and the operations further comprise:
   performing, by the at least one processor, channel decoding and voice decoding on a received downlink signal to obtain pulse code modulation (PCM) data;
   dividing the PCM data into multiple overlapping data frames;
   multiplying each of the multiple data frames by a window function, and performing a Fourier transformation to obtain a complex spectrum;
   calculating, at each pre-estimated frequency, a correlation coefficient between complex spectra of a previous frame and a current frame in a relaxation period; and
   determining, by the at least one processor, that the prompt tone is detected on a corresponding frequency in response to the correlation coefficient exceeding a preset threshold.

15. The at least one processor according to claim 14, wherein the operations further comprise:
   after the processor receives the call initiated by the third terminal, obtaining, according to network information obtained by the processor by parsing a system broadcast message of a current cell, prompt tone information pre-stored in the first terminal, and detecting a prompt tone in the downlink signal according to the pre-stored prompt tone information; and
   after determining, by the at least one processor, that the prompt tone is detected on a corresponding frequency:
      comparing a frequency and an amplitude of the detected prompt tone with a frequency and an amplitude in the prompt tone information pre-stored in the first terminal; and
      in response to either determining that the frequency and the amplitude of the detected prompt tone are the same as the frequency and the amplitude in the prompt tone information pre-stored in the first terminal, or determining that differences between the frequency and the amplitude of the detected prompt tone and the frequency and the amplitude in the prompt tone information pre-stored in the first terminal do not exceed comparison thresholds, determining, by the first terminal, that the prompt tone is detected.

\* \* \* \* \*